Patented June 20, 1939

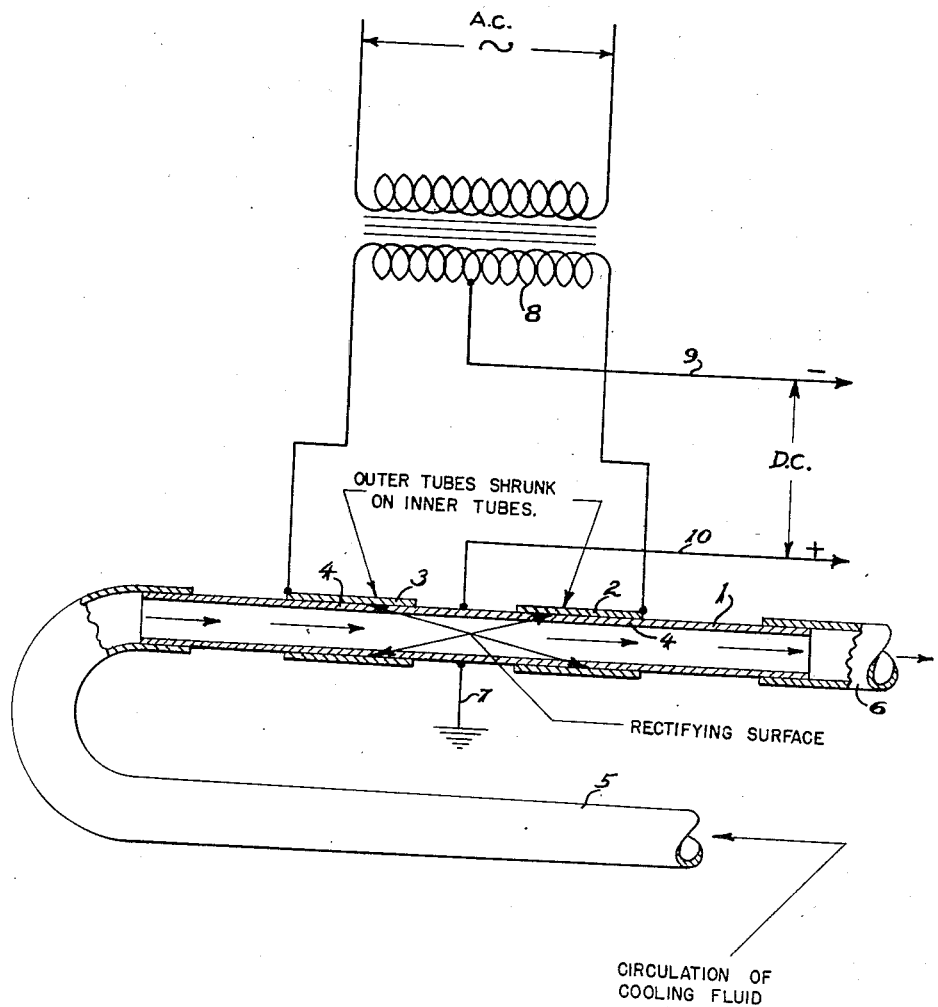

2,162,740

UNITED STATES PATENT OFFICE 2,162,740

FILM TYPE RECTIFIER

Carlos B. Mirick, Washington, D. C.

Application July 20, 1938, Serial No. 220,342

10 Claims. (Cl. 175—366)

(Granted under the act of March 3, 1883, as amended April 30, 1928; 370 O. G. 757)

This invention relates to means for rectifying alternating current to direct current and more particularly to a rectifier of the type wherein a rectifying film is disposed between two plates of conductive material.

Among the several objects of this invention are:

To provide an efficient rectifier of the film type;

To provide a rectifier of the kind mentioned wherein the necessary pressure is applied and maintained upon the rectifying film;

To provide means for effectively dissipating the heat developed in a rectifier.

Other objects will become apparent to those skilled in this art upon perusal of the description that follows in connection with the accompanying drawing, wherein is disclosed one embodiment of my invention.

The prior art abounds in various kinds of rectifying devices wherein the rectification is accomplished by causing the alternating current to pass through a film of some substance such as copper oxide, copper sulfide, copper and silver selenides, etc. As is well known, these materials have a unilateral conductivity and they are disposed between two electrically conductive members upon one of which the conductive film is formed and the other of which is held against the free surface of the film with sufficient pressure to obtain good electrical conductivity.

As depicted in the drawing, one contemplated form of my invention comprises a member 1 of electrically conducting material, preferably hollow or tubular. Disposed upon the member 1 are two sleeves 2 and 3, likewise of electrically conductive material and a film 4 having rectifying properties is formed on either the exterior surface of member 1 or the interior surface of members 2 and 3. The members 2 and 3 have a shrink fit with the member 1, that is, the members 2 and 3 have substantially the same internal dimensions as the external dimension of member 1 so that a close fit is maintained when at normal temperatures. The term "shrink fit" is to be understood as including changing the dimensions of either member 1 or sleeves 2 and 3 by reducing the temperature of member 1 or increasing the temperature of sleeves 2 and 3, or both, to permit assembling the members in the form shown, whereby a tight fit with constantly maintained pressure upon the film 4 is secured. While not practicably desirable, the sleeves 2 and 3 might be placed on the inside of member 1, with the film between the sleeves and member 1, without departing from the scope of this invention.

Conduits 5 and 6, of electrically insulating material, are connected to the member 1 to circulate a cooling medium, through member 1 to dissipate the heat developed during operation. If member 1 is maintained at ground potential by a ground connection, as at 7, the cooling medium may be water or any electrically conducting fluid. However, if member 1 is not at ground potential some non-conducting fluid such as oil must be employed as the coolant.

In the form shown, provision is made for full wave rectification by connecting the terminals of transformer secondary coil 8 to the sleeves 2 and 3, connecting the negative direct current lead 9 to a center tap on secondary 8 and the positive direct current lead 10 to the member 1, preferably at a point between the sleeves 2 and 3. It is obvious that my invention may equally well be utilized for half-wave rectification. Also, it is likewise obvious that my invention comprehends circulating the cooling medium outside the sleeves 2 and 3, although such construction would be less convenient to assemble than is the form illustrated in the drawing.

The invention herein described and claimed may be used and/or manufactured by or for the Government of the United States of America for governmental purposes without the payment of any royalties thereon or therefor.

I claim:

1. A rectifier system, comprising a tubular member of electrically conductive material, a pair of tubular electrically conductive sleeves shrunk on said member in spaced relation to each other, a rectifying film formed on one of the contacting surfaces between each said sleeve and said member, a transformer secondary coil having each of its terminals respectively connected to one of said sleeves, a primary coil operatively associated with said secondary, a direct current lead connected to a mid-point tap on said secondary, a second direct current lead connected to said member between said sleeves, means connecting a point on said member between said sleeves to ground, and means to circulate a cooling fluid through said tubular member.

2. A rectifier system, comprising a tubular member of electrically conductive material, a pair of tubular electrically conductive sleeves shrunk on said member in spaced relation to each other, a rectifying film formed on one of the contacting surfaces between each said sleeve and said member, a transformer secondary coil having each of its terminals respectively connected to one of said sleeves, a primary coil operatively associated with said secondary, a direct current lead connected to a mid-point tap on said secondary, a second direct current lead connected to said member between said sleeves, and means to circulate a cooling fluid through said tubular member.

3. A rectifier element, comprising a tubular member of electrically conducting material, two spaced apart areas of rectifying film formed on the exterior surface of said member, a conductive sleeve disposed over each of said film areas in shrink fit therewith, and means to circulate a cooling fluid through said tubular member.

4. A rectifier element, comprising two tubular sleeves of electrically conducting material, a rectifying film formed on the interior surface of each of said sleeves, a tubular member of conductive material in shrink fit inside both of said sleeves, said sleeves being spaced apart on said member, and means to circulate a cooling fluid through said member.

5. A rectifier element, comprising a tubular member of electrically conducting material, two sleeves of conductive material in spaced relation having shrink fit with said member, a rectifying film formed on one of the contacting surfaces between each said sleeve and said member, and means to circulate cooling fluid through said member.

6. A rectifier element, comprising a member of electrically conducting material, two spaced apart areas of rectifying film formed on the exterior surface of said member, and a conductive sleeve disposed over each of said film areas in shrink fit therewith.

7. A rectifier element, comprising two tubular sleeves of electrically conducting material, a rectifying film formed on the interior surface of each of said sleeves, a member of conductive material in shrink fit inside both of said sleeves, and said sleeves being spaced apart on said member.

8. A rectifier element, comprising a member of electrically conductive material, two sleeves of conductive material in spaced relation having shrink fit with said member, and a rectifying film formed on one of the contacting surfaces between each said sleeve and said member.

9. A rectifier element, comprising a tubular member of electrically conductive material, a sleeve of conductive material in shrink fit with said member, a rectifying film on a contacting surface between said sleeve and said member, and means to circulate a cooling fluid through said member.

10. A rectifier element, comprising a member of electrically conductive material, a sleeve of conductive material in shrink fit with said member, and a rectifying film on a contacting surface between said sleeve and said member.

CARLOS B. MIRICK.